(12) United States Patent
Sorenson, III et al.

(10) Patent No.: US 9,990,147 B2
(45) Date of Patent: Jun. 5, 2018

(54) METHODS AND APPARATUS FOR OPTIMIZING RESOURCE UTILIZATION IN DISTRIBUTED STORAGE SYSTEMS

(71) Applicant: Amazon Technologies, Inc., Seattle, WA (US)

(72) Inventors: James Christopher Sorenson, III, Seattle, WA (US); Gang He, Woodinville, WA (US); Saurabh Goel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 14/697,518

(22) Filed: Apr. 27, 2015

(65) Prior Publication Data

US 2015/0242150 A1    Aug. 27, 2015

Related U.S. Application Data

(63) Continuation of application No. 13/903,670, filed on May 28, 2013, now Pat. No. 9,020,984, which is a
(Continued)

(51) Int. Cl.
*G06F 17/30* (2006.01)
*G06F 3/06* (2006.01)

(52) U.S. Cl.
CPC ............ *G06F 3/0619* (2013.01); *G06F 3/065* (2013.01); *G06F 3/067* (2013.01); *G06F 3/0611* (2013.01);
(Continued)

(58) Field of Classification Search
CPC .................................................... G06F 3/0619
(Continued)

(56) References Cited

U.S. PATENT DOCUMENTS 6,032,224 A * 2/2000 Blumenau ............... G06F 12/08
710/15
6,269,382 B1 * 7/2001 Cabrera ............ G06F 17/30082
(Continued)

OTHER PUBLICATIONS

WWW.NECAM.COM/PRESS/READ.CFM?PRESS id=9248906F-4COE-47FC-AFB6-71B04B8B3AD2, "NEC Corporation of American Changes Storage Landscape with HYDRAstor Grid Storage Architecture", Dec. 11, 2014, pp. 1-3.
(Continued)

*Primary Examiner* — Sheree Brown
(74) *Attorney, Agent, or Firm* — Robert C. Kowert; Meyertons, Hood, Kivlin, Kowert & Goetzel, P.C.

(57) ABSTRACT

Methods and apparatus for optimizing resource utilization in distributed storage systems. A data migration technique is described that may operate in the background in a distributed storage data center to migrate data among a fleet of storage units to achieve a substantially even and randomized data storage distribution among all storage units in the fleet. When new storage units are added to the fleet and coupled to the data center network, the new storage units are detected. Instead of processing and storing new data to the newly added storage units, as in conventional distributed storage systems, the new units are blocked from general client I/O to allow the data migration technique to migrate data from other, previously installed storage hardware in the data center onto the new storage hardware. Once the storage load on the new storage units is balanced with the rest of the fleet, the new storage units are released for general client I/O.

20 Claims, 9 Drawing Sheets

Related U.S. Application Data continuation of application No. 13/053,469, filed on Mar. 22, 2011, now Pat. No. 8,452,819.

(52) U.S. Cl.
CPC .......... *G06F 3/0613* (2013.01); *G06F 3/0647* (2013.01); *G06F 3/0665* (2013.01); *G06F 3/0685* (2013.01); *G06F 3/0689* (2013.01); *G06F 2003/0692* (2013.01)

(58) Field of Classification Search
USPC .......................................................... 707/809
See application file for complete search history.

(56) References Cited

U.S. PATENT DOCUMENTS

| | | | |
|---|---|---|---|
| 7,555,482 B2* | 6/2009 | Korkus | G06F 21/316 |
| 7,685,360 B1 | 3/2010 | Brunnett et al. | |
| 7,805,665 B2 | 9/2010 | Chou et al. | |
| 8,019,965 B2* | 9/2011 | Agombar | G06F 3/0605 |
| | | | 711/112 |
| 8,131,784 B1* | 3/2012 | Zhuge | G06F 17/30194 |
| | | | 707/823 |
| 8,195,760 B2 | 6/2012 | Lacapra et al. | |
| 8,200,684 B2 | 6/2012 | Seitz et al. | |
| 8,266,182 B2 | 9/2012 | Wanigasekara-mohotti et al. | |
| 2004/0039891 A1* | 2/2004 | Leung | G06F 17/30067 |
| | | | 711/165 |
| 2004/0054656 A1* | 3/2004 | Leung | G06F 17/30067 |
| 2007/0113226 A1 | 5/2007 | Baron et al. | |
| 2007/0214505 A1 | 9/2007 | Stavrou et al. | |
| 2007/0266056 A1 | 11/2007 | Stacey et al. | |
| 2007/0288466 A1* | 12/2007 | Bohannon | G06F 9/505 |
| 2008/0005383 A1 | 1/2008 | Bender et al. | |
| 2008/0040558 A1* | 2/2008 | Rhoades | G06F 11/2064 |
| | | | 711/143 |
| 2008/0247282 A1 | 10/2008 | Chen | |
| 2008/0307178 A1* | 12/2008 | Agombar | G06F 3/0605 |
| | | | 711/162 |
| 2009/0043828 A1 | 2/2009 | Shitomi | |
| 2009/0077097 A1 | 3/2009 | Lacapra et al. | |
| 2009/0106255 A1 | 4/2009 | Lacapra et al. | |
| 2009/0144516 A1 | 6/2009 | Sandorfi | |
| 2010/0138440 A1 | 6/2010 | Driesen | |
| 2010/0199041 A1* | 8/2010 | Schnapp | G06F 3/0605 |
| | | | 711/114 |
| 2011/0072208 A1 | 3/2011 | Gulati et al. | |
| 2011/0191550 A1 | 8/2011 | Lee et al. | |
| 2012/0023302 A1 | 1/2012 | Arndt et al. | |
| 2012/0166492 A1 | 6/2012 | Bikkula et al. | |

OTHER PUBLICATIONS

U.S. Appl. No. 13/053,469, filed Mar. 22, 2011, James Christopher Sorenson III, et al.

U.S. Appl. No. 13/903,670, filed May 28, 2013, James Christopher Sorenson III, et al.

* cited by examiner

METHODS AND APPARATUS FOR OPTIMIZING RESOURCE UTILIZATION IN DISTRIBUTED STORAGE SYSTEMS

This application is a continuation of U.S. application Ser. No. 13/903,670, filed May 28, 2013, now U.S. Pat. No. 9,020,984, which is a continuation of U.S. application Ser. No. 13/053,469, filed Mar. 22, 2011, now U.S. Pat. No. 8,452,819, which are incorporated by reference herein in their entirety.

BACKGROUND

In large-scale distributed storage systems, clients may upload large amounts of data on a regular basis. For example, in a typical cluster or data center, clients may upload several hundred terabytes of data every day. To store clients' new data, distributed storage systems generally add new hardware (e.g., hosts) on a regular schedule, which may mean adding several racks of new hardware at each data center every week. A challenge large-scale distributed storage systems face with this is that a majority of new data tends to be processed and stored to the newly added hardware, because the old hosts are typically nearly full in terms of storage space. From a storage perspective, the new hardware has enough free disk space to accommodate the client data; however, the new hardware may not have enough processing power and resources (e.g., CPU, memory and disk IOPS) to process and store the new data efficiently. At a smaller scale, this may not be a problem as the new hardware may have enough processing power, but at larger scales, when the request load tends to exceed the processing power capacity of the new hardware, this may result in a hot spot (the new hardware) in the distributed storage system, resulting in poor performance (latency and throughput) and higher error rates for client requests. Using higher-end hardware to increase the processing power generates a high business cost and may be wasteful, since once the new hardware is filled up the upload shifts to a next round of newly added hardware.

Another consequence of such a hot spot is that newly uploaded data is generally stored in new hardware added at the same time across two or more data centers, which may create an undesirable strong correlation in data distribution. For example, if there is a defect in a batch of hardware installed across data centers so that the devices in the batch fail in all the data centers, all copies of client data distributed to the different data centers may be lost, which may result in a permanent data loss.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
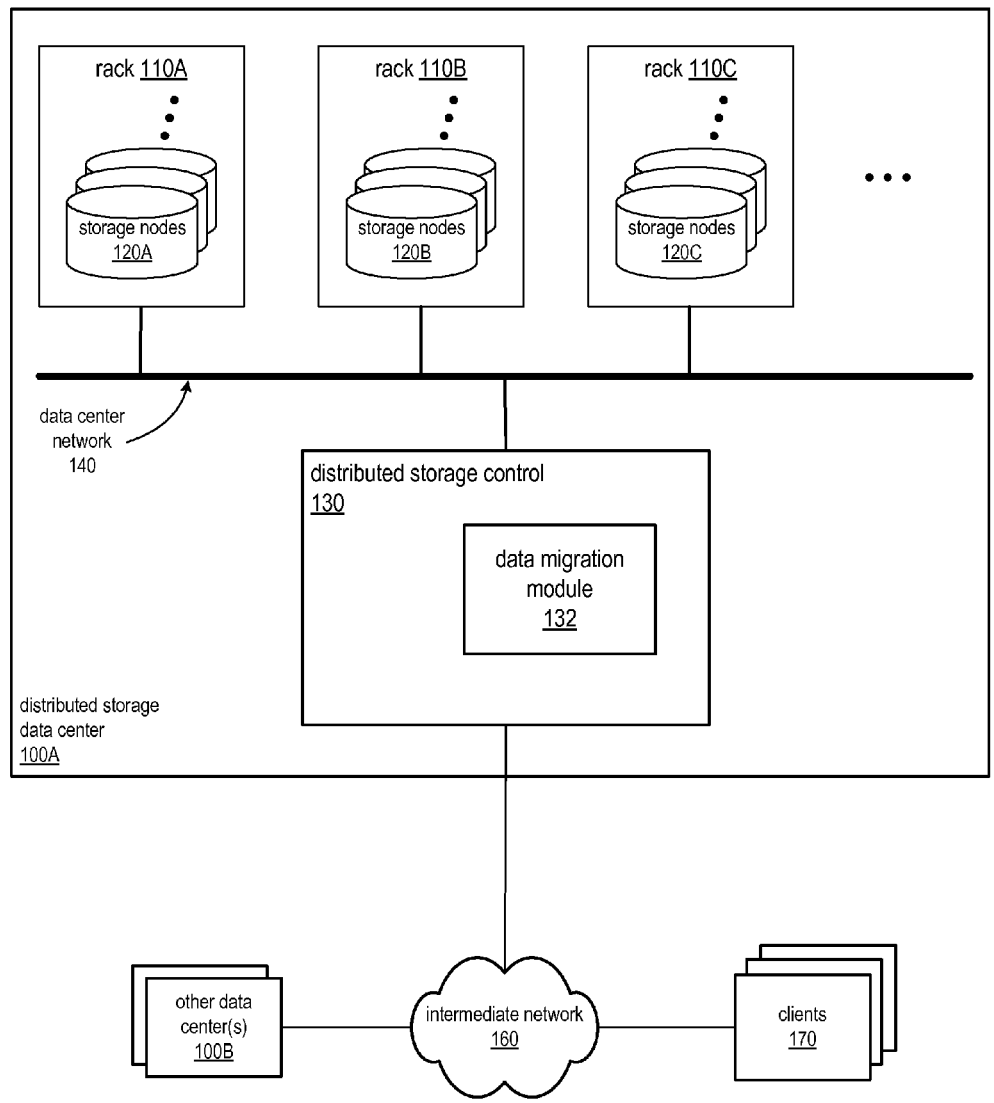
FIG. 1 illustrates a distributed storage system, according to at least some embodiments.
Figure 9:
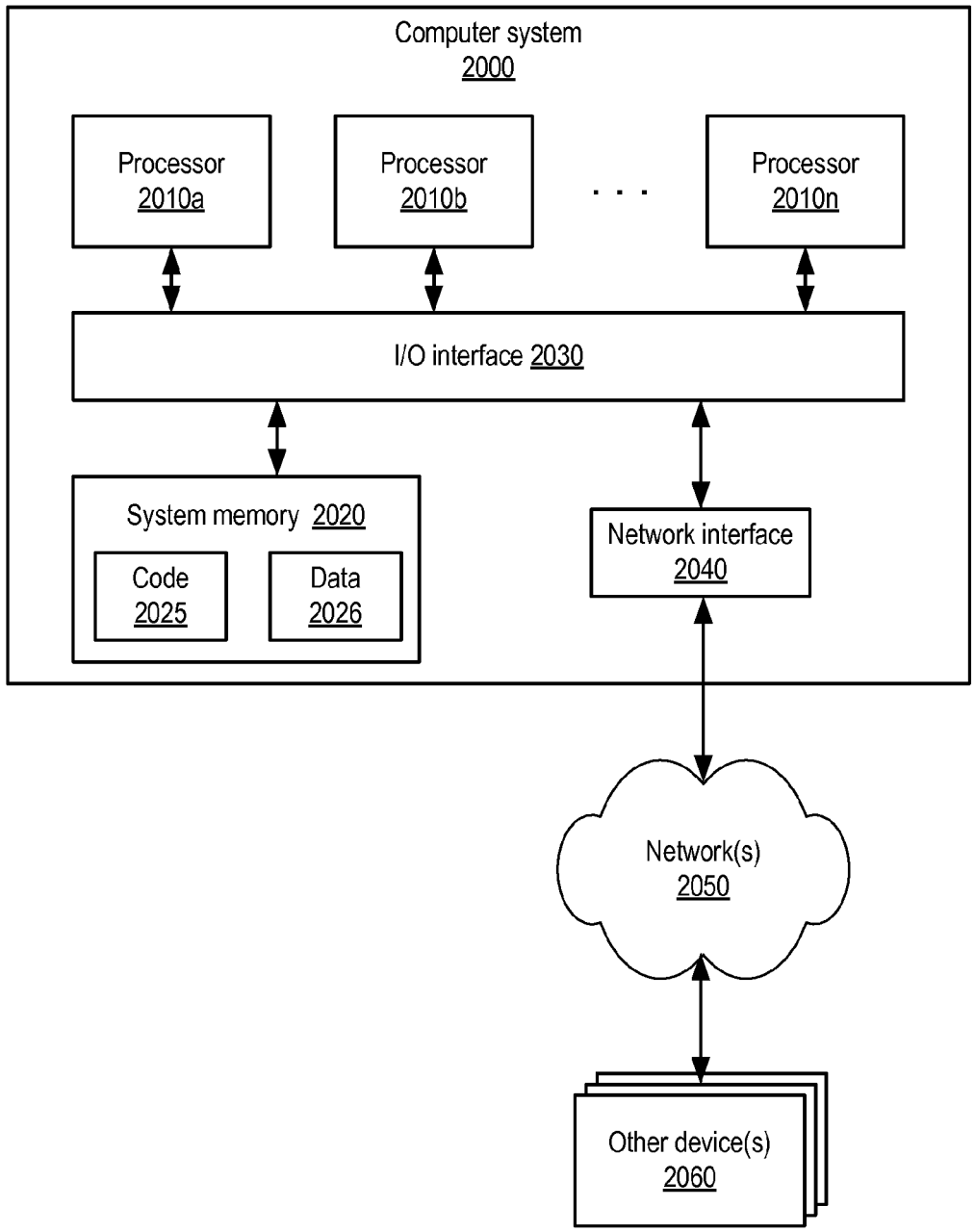
FIG. 9 is a block diagram illustrating an example computer system that may be used in some embodiments.

Various embodiments of methods and apparatus for optimizing resource utilization in distributed storage systems are described. FIG. 1 illustrates a distributed storage system, according to at least some embodiments. A distributed storage data center 100A may include tens, hundreds, or even thousands of racks 110, each rack including multiple storage nodes 120 (e.g., rack 110A including storage nodes 120A, rack 110B including storage nodes 120B, and rack 110C including storage nodes 120C). Each rack 110 may also include one or more other components, such as a rack controller device, power supply, network interface, backplane for connecting rack-mountable components, etc. Collectively, the racks 110 including storage nodes 120 may be referred to as a fleet. Each storage node 120 may be a server device including one or more storage disks, one or more processors, memory, a network interface, and so on. An example system that may be used as a storage node 120 is illustrated in FIG. 9. Storage nodes 120 may be rack servers or blades. A rack server is a single server device that is rack-mountable. A blade is a relatively small server device; several blades may be mounted in a rack-mountable chassis, which may collectively be referred to as a "blade server." Each storage node 120 in each rack 110 may be coupled to a data center network 140. New storage nodes 120 may be periodically or aperiodically added to the fleet, generally in units of racks 110 including rack servers, where each rack server is a storage node 120, or in units of racks including blade servers, each blade server including multiple blades, where each blade is a storage node 120. However, new storage nodes 120 may be added in units of blade servers or in units of rack servers installed into existing racks 110. Where the term "rack" is used herein, it is to be understood that the term may refer to either racks containing rack servers or racks containing blade servers.

Clients 170 may access the distributed storage provided by the fleet of storage nodes 120 in data center 100A via an intermediate network 160 to read client data from and/or write client data to the fleet. Distributed storage control 130 may include various hardware (e.g., one or more server systems and/or other devices) and/or software that may manage data storage across the fleet, as well as managing general client I/O traffic. An example system that may be used to implement a portion or all of distributed storage control 130 is illustrated in FIG. 9.

A distributed storage system may, but does not necessarily, include one or more other data centers 100B coupled to the intermediate network 160 that are similar to data center 100A. The data centers 100 may be geographically dispersed across one or more regions, states, or even countries. Note that client data may be, but is not necessarily, distributed and/or replicated across two or more storage nodes 120 within a rack 110, across two or more racks 110 within a data center 100, and/or across two or more data centers 100.

Embodiments may implement a data migration technique, for example in or as a data migration module 132 of distributed storage control 130, that performs storage load balancing. In at least some embodiments, the data migration technique works constantly in the background in a distributed storage data center to move data from storage node to storage node, and/or from rack to rack, in the data center to achieve a substantially even and randomized data storage distribution among all storage nodes and racks in the data center. When new storage hardware (e.g., one or more racks 110 each including one or more storage nodes 120, or alternatively one or more blade servers each including multiple blades, where each blade is a storage node 120) is added to the fleet in the data center and coupled to the data center network, the new storage hardware is detected. Instead of processing and storing new data to the newly added storage hardware, as in conventional distributed storage systems, embodiments isolate or block the new hardware from general client I/O to allow the data migration technique to migrate data from other, previously installed storage hardware in the data center onto the new storage hardware. Once the storage load on the new storage hardware is substantially balanced with the rest of the storage hardware in the data center, the new storage hardware is released for general client I/O.

The data migration technique may include one or more components that implement a storage load balancing technique that tracks storage space utilization among a portion or all storage units (e.g., storage nodes and/or racks) within a distributed storage data center or distributed storage system. Storage space utilization information that is tracked may include both storage space utilization on individual storage units and aggregate storage space utilization across the fleet of storage units. The data migration technique may also implement a storage load balancing algorithm that decides from which sources to move how much data to which destinations to achieve a substantially balanced distribution of stored data across the fleet of storage units, based at least in part on the tracked storage space utilization information.

The data migration technique may determine or detect when a balanced distribution of data is achieved. What is considered "balanced" or "substantially balanced" may depend on the distributed data storage environment in which the data migration technique is implemented. Thus, the determination of when a balanced distribution of data is achieved may depend on the distributed data storage environment in which the data migration technique is implemented.

In an example implementation, the data migration technique may select a storage unit as a source storage unit for migration based on a comparison of the storage space utilization on the storage unit to the aggregate storage space utilization across the fleet. If the storage space utilization on the storage unit is lower than the aggregate storage space utilization, then the storage unit may be rejected as a source storage unit. If the storage space utilization on the storage unit being considered as a possible source storage unit for migration is higher than the aggregate storage space utilization, then the storage unit may be selected as a source storage unit (note that other factors may also be considered when selecting source storage units). The data migration technique may then migrate one or more data units from the source storage unit to destination storage unit(s), stopping the migration of data units from the source storage unit when migrating one single data unit from the source storage unit results in storage space utilization on the source storage unit being lower than or equal to the aggregate storage space utilization.

On the destination side, the data migration technique migrates data units from source storage units to a given destination storage unit until detecting that the migration of a single storage unit results in storage space utilization on the destination storage unit being greater than or equal to the aggregate storage space utilization.

This example implementation results in the fleet of storage units being substantially balanced when the storage load utilization is within a range based on the ratio of the size of the data units being migrated to the total storage capacity of the storage units. For example, if the data units are each approximately 16 gigabytes, and the storage capacity of the storage units is 24 to 32 terabytes, then the storage units may be balanced to within less than one percent.

General client I/O traffic to and from the storage units in the fleet may continue during migration, excluding new units that are blocked by the data migration technique. In addition, the data migration technique may direct the migration of data from multiple source storage units to multiple destination storage units concurrently. The data migration technique may continue to track storage utilization during migration so that the storage utilization information used in making migration decisions is current.

In at least some embodiments, redundant copies or replicas of data units may be maintained on different storage units within the distributed storage system or data center. When migrating data to a new storage unit for which general client I/O traffic is blocked until the new unit is balanced, the data migration technique may ensure that copies of the same data units are not migrated to the new storage unit. Via the existence of redundant copies or replicas of data units in the fleet, clients still have logical access to data units that are being or have been migrated to new storage units, even though physical access to the particular copies of the data migrated to the new storage unit is blocked for the clients.

In addition, the data migration technique may have limited impact on the existing storage units in the fleet. Storage units that are selected as source storage units for migration are not blocked to client I/O traffic during migration from the units; therefore, clients still have access to the data units on the source storage units. In addition, in typical data centers, the ratio of candidate source storage units to destination storage units (new storage units being added to the fleet)

may be very high, for example hundreds or thousands of potential source storage units to one or a few new storage units being added. In addition, the data migration technique may migrate relatively small amounts of data from many selected source storage units to one or a few new storage units to balance the new storage units. Thus, the average migration load on the existing storage units in the data center fleet may be very low. Note that the ratio of candidate source storage units to destination storage units gets higher as more storage units are added, and thus the average migration load on the existing storage units in the data center fleet actually decreases as the fleet is scaled up. The low average migration load on storage units in the fleet thus achieved helps to enable the data migration traffic to coexist with the general client I/O load with little or no impact on the client experience.

For at least these reasons, the data migration technique may have little or no impact on client I/O traffic or on the client user experience. In other words, the data migration technique may generally be transparent to the clients of the distributed data system in which the technique is implemented.

The data migration technique may also include one or more components that perform the actual data movement between storage units (e.g., storage nodes and/or racks) under direction of the one or more components that implement the storage load balancing technique. The component(s) that perform the actual data movement may be distributed across two or more devices in the network to help prevent the component(s) from becoming a bottleneck. In at least some embodiments, each storage unit (e.g., each rack 110 or each storage node 120) may include a component that performs data movement operations or tasks under direction of the storage load balancing technique.

In addition, the data migration technique may include one or more components that detect new storage hardware when coupled to the data center network, that isolate or block general client I/O operations to the new hardware until the new storage hardware is substantially balanced by the data migration technique, and that then open or unblock the new storage hardware to general client I/O. The data migration technique may also include one or more other components that perform various other tasks including but not limited to operation support.

The substantially balanced data storage distribution achieved by the data migration technique may allow all storage nodes in a fleet, including but not limited to new storage hardware after installation and storage load balancing, to take clients' uploads and other data accesses with a high level of processing power aggregated from all storage nodes in a distributed data storage system. The data migration technique may help to reduce the number of new storage units that need to be installed to support the current client I/O request load. When new storage units are added and balanced according to the data migration technique, available storage increases across the fleet, and thus the client request load may remain balanced across the fleet.

In at least some implementations of a distributed storage system, the aggregate point-in-time resources needed on destination storage units in the fleet may be proportional to the average rate, and not the peak rate, at which clients upload data into the storage system. In general, there may be a large variation in the client request rates across different time periods, e.g. across different times of the day and/or different times of the week. Such variation may be effectively absorbed by the resources aggregated across all source storage units, while keeping the number of newly added destination units to a minimum. In addition, data may be moved by the data migration technique in relatively large data units between the source and destination storage units, which enables sequential I/O workload on the storage units. This may, for example, improve or maximize the throughput on less expensive storage units with relatively low IOPS/storage-capacity ratio. However, note that, in practice, the effective throughput of data transfer is generally determined by network bottlenecks.

Given that the set of destination (new) storage units are not directly used for servicing client requests and on an average have poor space utilization (the average space utilization for a new storage unit over the period the storage unit remains a destination is <=50%), it may be desirable to keep the number of destination units (at any point in time) to a minimum. Embodiments of the data migration technique may employ one or more methods to help minimize the set of destination storage units may include:

Requiring new storage units to handle only the average upload rate (conventional systems not using the data migration technique need to provision new capacity based on peak upload rate, which may be an order of magnitude larger).

Maximizing throughput by fully utilizing the hardware resources on each destination storage unit by blocking client requests to the storage unit. Higher levels of utilization yields better throughput, but may result in worse latencies because of elevated levels of resource contention. Migration workload is not client-facing is so is not latency sensitive, but client requests are. By blocking the client requests to destination storage units, embodiments may optimize for hardware utilization (throughput) and not worry about latencies, with little or no impact on the client experience.

Sequential I/O workload on the storage units helps with throughput by allowing the data migration technique to move more bytes with fewer disk IOPS. This allows for less expensive, denser storage units with lower IOPS/storage-capacity ratios.

The substantially balanced data storage distribution and randomized distribution of data achieved by the data migration technique may help to prevent "hot spots" such as single storage nodes or racks that receive an inordinate amount of client traffic. The randomized and balanced distribution of data achieved by the data migration technique may reduce or eliminate the problem of data location correlation within a data center or across two or more data centers in a distributed data storage system. For example, if all new storage hardware in a batch of storage hardware installed across data centers fails due to some problem in the batch, it is highly unlikely that a particular client's data is all located on the failed storage hardware. In conventional systems, where new data is processed and stored to newly added storage hardware, such a failure is much more likely to result in the loss of a client's data.

While embodiments of the data migration technique are generally described herein in applications related to distributed storage systems and to adding (or removing) storage units from fleets of storage units in distributed storage data centers, embodiments of the data migration technique may be adapted for use in other applications in which balancing of data may be desirable and data may be migrated, and in which resources may be added and/or removed. For example, embodiments may be adapted for use in memory-based resource allocation in memory-based hashing techniques.

In addition, while embodiments of the data migration technique are generally described herein in relation to migrating data within a data center, embodiments may be adapted to migrate data across two or more data centers.

Mapping Technique

Figure 2:
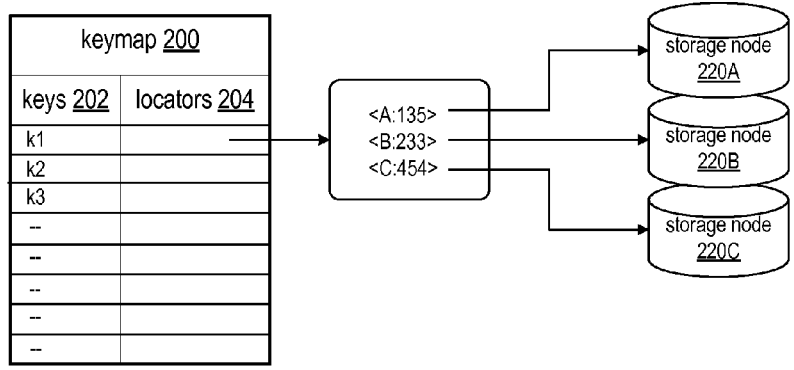
FIG. 2 illustrates a conventional mapping technique.

In at least some embodiments, to facilitate the data migration technique as well as for other data storage benefits, a data storage and mapping technique may be implemented that provides an intermediate mapping level between the index layer for accessing individually addressable data elements and the physical storage layer at which data units that each include a plurality of the data elements are stored. In an example conventional mapping technique, as illustrated in FIG. 2, units of data (which may be referred to as data units) that are stored to the storage nodes 220A, 220B, and 220C at the storage layer are tightly coupled to keymaps 200 at the index layer. Entries in the keymap 200, which each may include a key 202 and a corresponding set of one or more locators 204, point directly to the storage nodes 220 on which the corresponding data units are stored. However, this conventional mapping technique is not easily scalable. When migrating data units, there is a 1:1 correspondence with necessary updates to the keymap 200. When repairing data units, the keymap 200 must also be updated.

In the data storage and mapping technique, data are stored on the plurality of storage units as individually addressable data elements. However, the data elements are stored in data units that each include a plurality of the individually addressable data elements. Mapping information is maintained at an index layer for accessing the data elements that maps each addressable data element to one or more data units. At an intermediate level between the index layer and the storage layer, mapping information is maintained that maps each data unit to a storage unit. When migrating data according to the data migration technique, the data units, each including a plurality of data elements, may be migrated. Thus, the data migration technique may update the mapping information for migrated data units that is maintained at the intermediate level rather than having to update the mapping information for each data element that is migrated at the index level. This data storage and mapping technique allows data migration to be performed with much less updating of mapping information.

Figure 3:
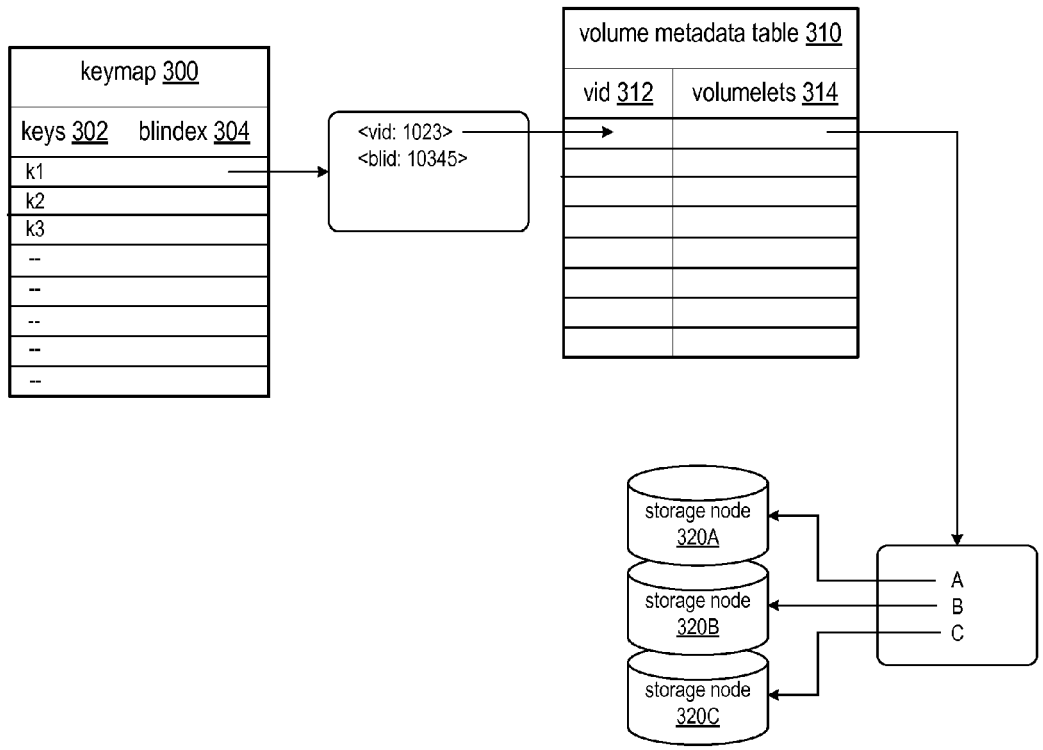
FIG. 3 illustrates a volume mapping technique that may be leveraged in at least some embodiments to facilitate the data migration technique.

FIG. 3 illustrates, as an example implementation of a data storage and mapping technique as described above, a volume mapping technique that may be leveraged in at least some embodiments to facilitate the data migration technique. In the volume mapping technique, a level of indirection is added at an intermediate level between the index layer (the keymap 300) and the storage layer (storage nodes 320A, 320B, and 320C, in this example). The level of indirection may involve a volume mapping table 310, as shown in FIG. 3. The level of indirection provided by the volume mapping technique greatly reduces the need to update mapping information when migrating data, which facilitates the data migration technique. In addition, the level of indirection provided by the volume mapping technique allows data units to be repaired without the need to update the corresponding keymap entry. The volume mapping technique may enable the implementation of other features, for example, erasure coding. Without the volume mapping technique, erasure coding may create too much traffic to the keymap 300 when performing disk repair. With the volume mapping technique, the keymap 300 is not relied upon when performing disk repair.

In the volume mapping technique as illustrated in FIG. 3, the locators in the keymap 300 are replaced with an index (referred to herein as a volume ID, or vid) into another table (volume metadata table 310) of virtual, highly durable virtual storage devices referred to as volumes, and an index into the referenced volume (referred to herein as a blob ID, or blid). The replacement for the locator may be referred to herein as a blindex (vid+blid index).

The term blob stands for "binary large object." A blob, as used herein, is a sequence of bytes that are reliably stored. A blob may be accessed using a blindex. A volume, as used herein, is a collection of blobs, and is a virtual storage device that is spread across two or more storage nodes. A volume is composed of volumelets. A volumelet is a single copy (or shard) of a volume. A volumelet is a contiguous block of storage on a disk, and may contain thousands or millions of data objects. Each volumelet for a volume may have the same blobs. All volumelets for a volume store each blob against a commonly shared blid. Each volumelet resides on a single disk on a storage node; however, a volume's volumelets each reside on a different storage node.

The entries in the volume metadata table 310 map from the entries in the keymap 300 to physical resources. Each entry in volume metadata table 310 contains one or more references to volumelets 314. The volume metadata table 310 does not track blob-level details; these are tracked by the blid portion of the blindex 304 stored in keymap 300.

In a distributed storage system implementing the volume mapping technique, repairs and data movement (including, but not limited to, data migration) may be performed in units of volumelets. Thus, instead of updating a keymap 200 entry for each data object that is repaired or moved, as with the mapping technique shown in FIG. 2, embodiments may instead update a volume metadata table 310 entry. Since a volumelet may contain thousands or millions of data objects, many fewer mapping updates need to be made.

While embodiments are generally described herein in relation to distributed storage systems that implement a data storage and mapping technique that provides an intermediate mapping level between the index layer for accessing individually addressable data elements and the physical storage layer at which data units that each include a plurality of the data elements are stored, embodiments may be implemented in distributed storage systems that implement other data mapping and data storage techniques.

Data Migration and Storage Load Balancing Techniques

Figure 4A:
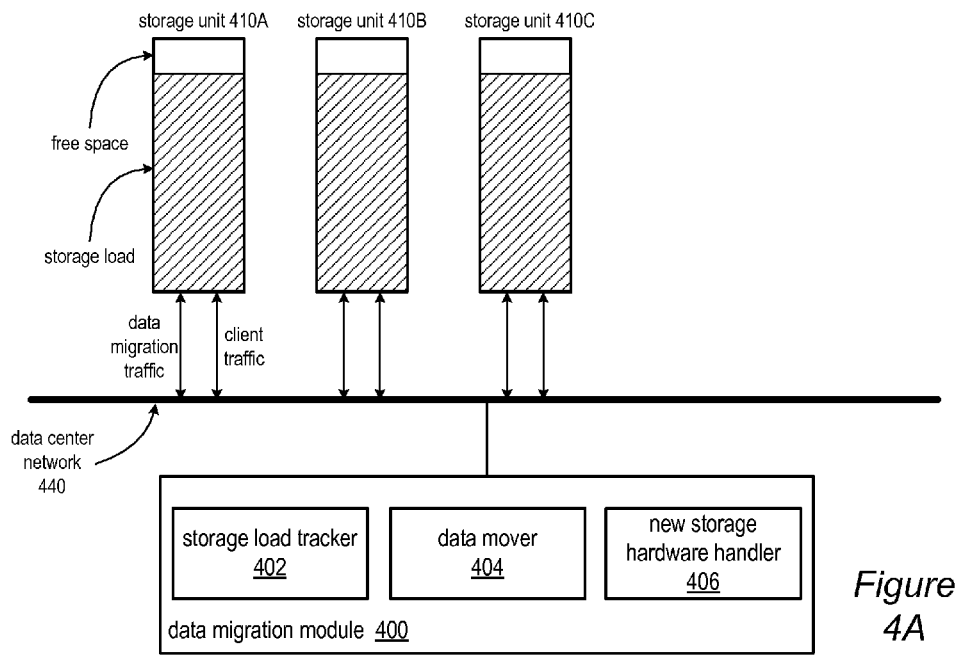
FIGS. 4A through 4D graphically illustrate a data migration module implementing a data migration technique for obtaining and maintaining an even data storage distribution across a fleet of storage units in a data center, and that balances new storage units prior to releasing the units to general client traffic, according to at least some embodiments.

FIGS. 4A through 4D graphically illustrate a data migration module implementing a data migration technique for obtaining and maintaining an even data storage distribution across a fleet of storage units in a data center, and that balances new storage units prior to releasing the units to general client traffic, according to at least some embodiments. FIG. 4A illustrates a data center that includes a fleet of storage units 410 coupled to a data center network 440. For illustrative purposes, FIG. 4A shows three storage units 410A, 410B, and 410C; however, a data center may include tens, hundreds, or thousands of storage units 410. A storage unit 410 may generally be a rack including multiple storage nodes, as previously described, but may also be some other unit of storage hardware, such as a blade server including multiple blades, where each blade is a storage node, or even a single storage node as described herein.

A data migration module 400 that performs storage load balancing in the fleet may be coupled to data center network 440, and may include a storage load tracker 402 component, a data mover 404 component, and a new storage hardware handler 406 component. An example system that may implement a portion or all of data migration module 400 is illustrated in FIG. 9. Storage load tracker 402 may track storage space utilization (storage load) among all storage units 410 in the fleet, and may implement a storage load balancing that determines source storage units 410 from which data is to be moved, what and how much data to move from the source storage units 410, and which other (destination) storage units 410 the data is to be moved to. As previously described, in at least some embodiments, data may be stored in data units each including a plurality of individually addressable data elements, and data may be selected for migration as data units.

In at least some embodiments, the storage load balancing algorithm implemented by the storage load tracker 402 may implement an N-choices technique for selecting storage units to which data is to be migrated and/or for selecting storage units from which data is to be migrated. The N-choices technique is a constant time randomized load balancing algorithm for distributing a given quantity evenly across N units. In the N-choices technique, a relatively small subset of K units is selected from among a larger set of N units. One of the K units is selected according to some criterion or criteria (e.g., a unit with a minimum load may be selected). An N-choices technique that may be adapted for use in some embodiments is described in the paper titled *Balanced Allocations*, the authors of which are Y. Azar, A. Broder, A. Karlin, and E. Upfal, which was published in *Proceedings of the 26th ACM Symposium on the Theory of Computing*, 1994, pp. 593-602, and which is incorporated by reference herein in its entirety. Note, however, that other techniques for selecting storage units to which data is to be migrated and/or for selecting storage units from which data is to be migrated may be employed in some embodiments instead of the N-choices technique.

As an example of a different method for storage load balancing that may be implemented in some embodiments, all possible storage units to which data may be migrated from and/or to may be enumerated, and the storage load balancing technique may examine or communicate with every possible source unit and destination unit to determine the current storage load and/or free space on the units. Source and destination units may then be picked from the entire set bases on this information and one or more other criteria or constraints, and data may be migrated from the selected source unit(s) to the selected destination unit(s). This process may be repeated until storage load balance is achieved. The storage load information for all the storage units may be cached to help speed up the process.

In at least some embodiments, the storage load balancing algorithm implemented by the storage load tracker 402 may make migration decisions according to a policy that enforces one or more global and/or local resource constraints when deciding when to migrate, where to migrate data from and to, and what data to migrate. A global resource constraint is a constraint that applies to a network-wide or fleet-wide resource, while a local resource constraint applies to one or a subset of components (e.g., storage units) within a data center. The global and/or local resources that may be constrained may include, but are not limited to, network bandwidth, the processing capacity of the storage units or other storage- or network-related hardware, and in general any hardware and/or software resource of the distributed storage system that may be impacted by data migration. Through the policy, caps or thresholds on how much of a particular global or local resource may be used when migrating data may be specified and enforced.

Data mover 404 may perform the actual moving of the data among the storage units 410 according to the determinations of the storage load tracker 402. Data mover 404 may also update mapping information for the data according to the moves. As previously described, in at least some embodiments, data may be stored in data units each including a plurality of individually addressable data elements, and data may be selected for migration in data units. In these embodiments, updating the mapping information may involve updating mapping information at an intermediate level that maps data units to storage units, rather than updating mapping information at an index layer that maps data elements to data units.

While FIGS. 4A through 4D show data mover 404 as a component within data migration module 400, in at least some embodiments the data mover 404 component of the data migration technique may be distributed across two or more devices in the network to help prevent the data mover from becoming a network bottleneck. For example, in at least some embodiments, each storage unit 410 may include a data mover component that performs the actual data movement operations or tasks relative to the respective storage unit under direction of the storage load tracker 402, which makes global migration decisions for all of the storage units 410 in the fleet.

The operations of the storage load tracker 402 and the data mover 404 result in relatively even utilization of all storage system resources, and thus help prevent "hot spots" such as single storage units 410 that receive an inordinate amount of client traffic. As a result of the storage load balancing performed by the data migration module 400, every storage unit 410 is maintained with substantially the same amount of free space, allowing the distribution of client traffic relatively symmetrically across the entire fleet. In addition, in at least some embodiments, the storage load tracker 402 of the data migration module 400 may implement a storage load balancing technique that substantially randomizes the distribution of client data and data types across the fleet, which also contributes to the relatively symmetrical distribution of client traffic across the fleet. In at least some embodiments, the storage load tracker 402 may also insure that copies of the same data are not stored on the same storage unit 410.

Figure 4B:
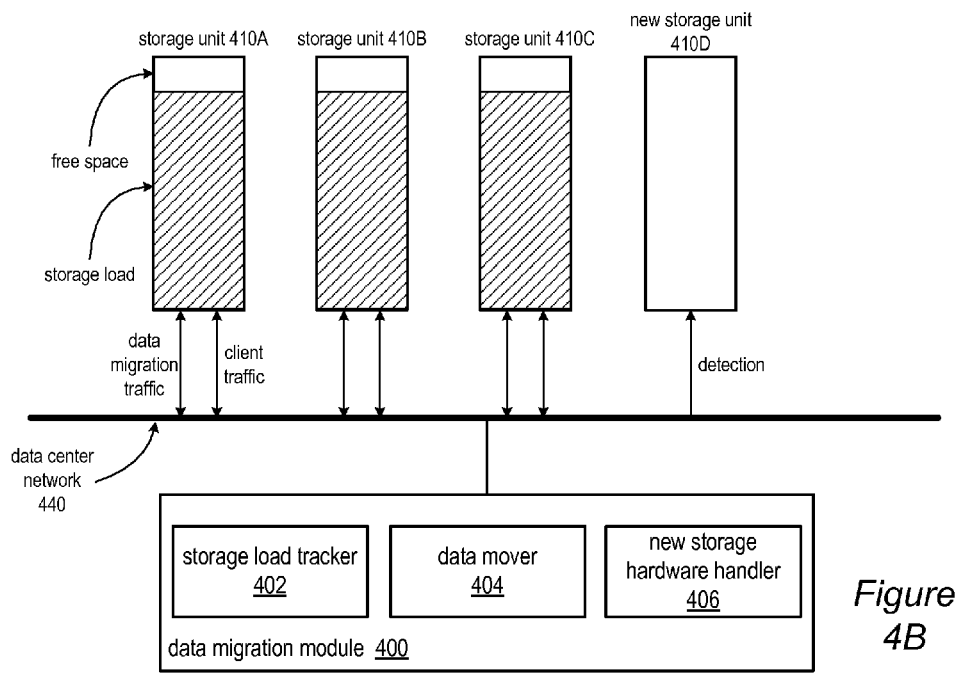

FIG. 4B illustrates the addition of a new storage unit 410D to the fleet. Upon or after connecting the new storage unit 410D to the data center network 440, the new unit 410D may be detected. In at least some embodiments, the new storage unit 410D may be automatically detected by a new storage hardware handler 406 component of the data migration module 400. Alternatively, the presence of a new storage unit 410D may be manually indicated to the data migration module 400. While FIG. 4B shows a single new storage unit 410D being added and detected, two or more new storage units may be added and detected substantially simultaneously.

Figure 4C:
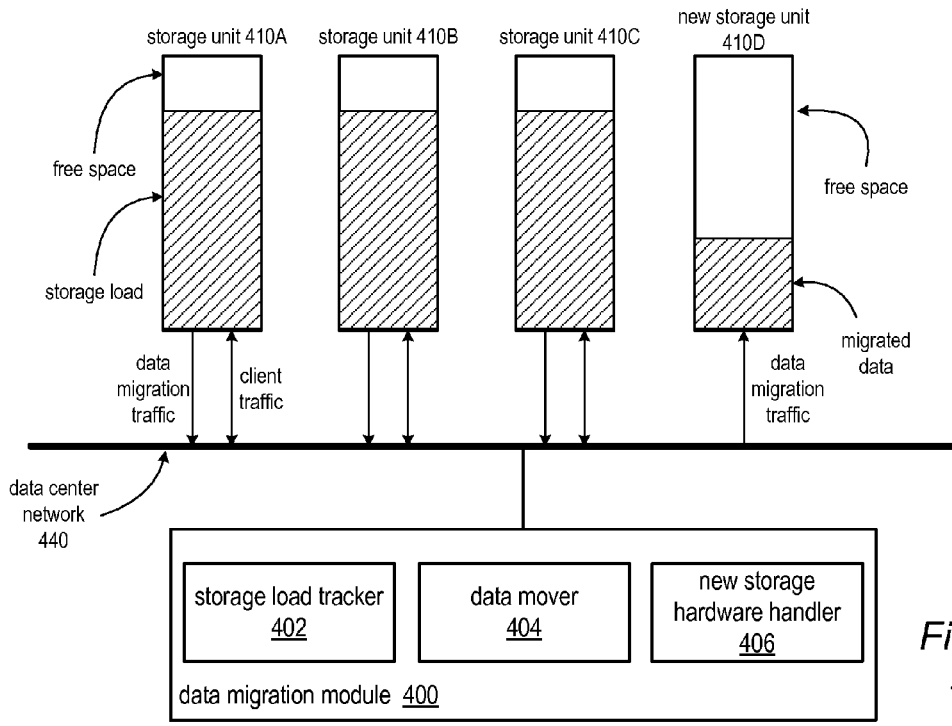

FIG. 4C illustrates migration of data to a detected new storage unit 410D to balance the new unit 410D with the rest of the fleet, while not permitting the uploading of large chunks of new client data to the new unit 410D. After the new storage unit 410D is detected, the data migration module 400 may begin to migrate data selected according to the storage load balancing algorithm from other, previously installed and balanced storage units in the fleet (e.g., storage units 410A through 410C) to the new storage unit 410D. While the new storage unit 410D is being balanced with the rest of the fleet by the data migration module 400, client traffic is blocked to the unit 410D. However, client traffic continues as normal to the rest of the fleet. Note that, as the storage load on the new unit 410D increases, storage load on the other, existing units 410A through 410C decreases.

In at least some embodiments, the storage load balancing technique may concentrate the migration efforts on the new storage unit 410D as the destination for migration, while selecting from among the existing storage units 410 according to a randomizing selection technique, for example an N-choices technique as previously described. The storage load balancing technique may thus distribute the source migration load across many existing storage units 410, while hammering one or a few new storage units, such as unit 410D, as destinations for migrating data until the new unit(s) are balanced with the rest of the fleet.

Figure 4D:
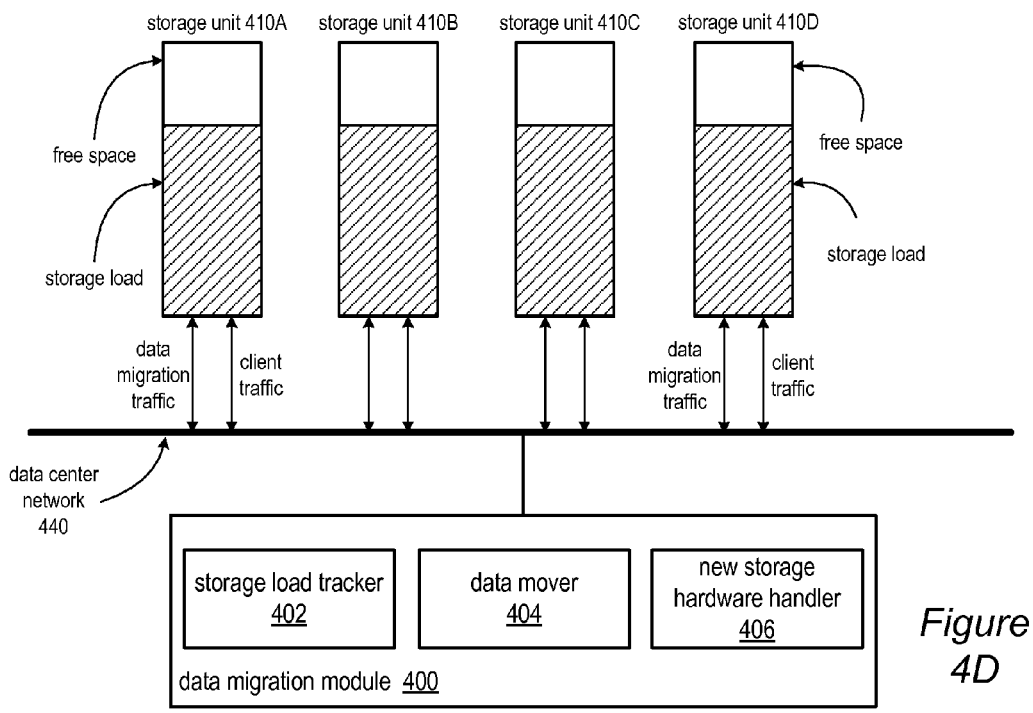

FIG. 4D illustrates completion of the balancing of the new storage unit 410D. The data migration module 400 may detect when the new storage unit 410D is substantially balanced with the rest of the fleet. In response, the new storage unit 410D is unblocked so that client traffic can hit the unit 410D. In addition, the data migration module 400 includes the storage unit 410D in its normal storage load balancing, as illustrated in FIG. 4A. Note that, while the storage load on the new unit 410D has been increased via the migration process until it is balanced with the rest of the fleet of storage units, storage load across the entire fleet has been reduced, and total free space in the fleet has been increased. In addition, the storage load (and thus the free space) is substantially balanced across all the storage units in the fleet, which helps to distribute client I/O traffic (both gets and puts) evenly across the fleet and thus helps to prevent hot spots.

Figure 5:
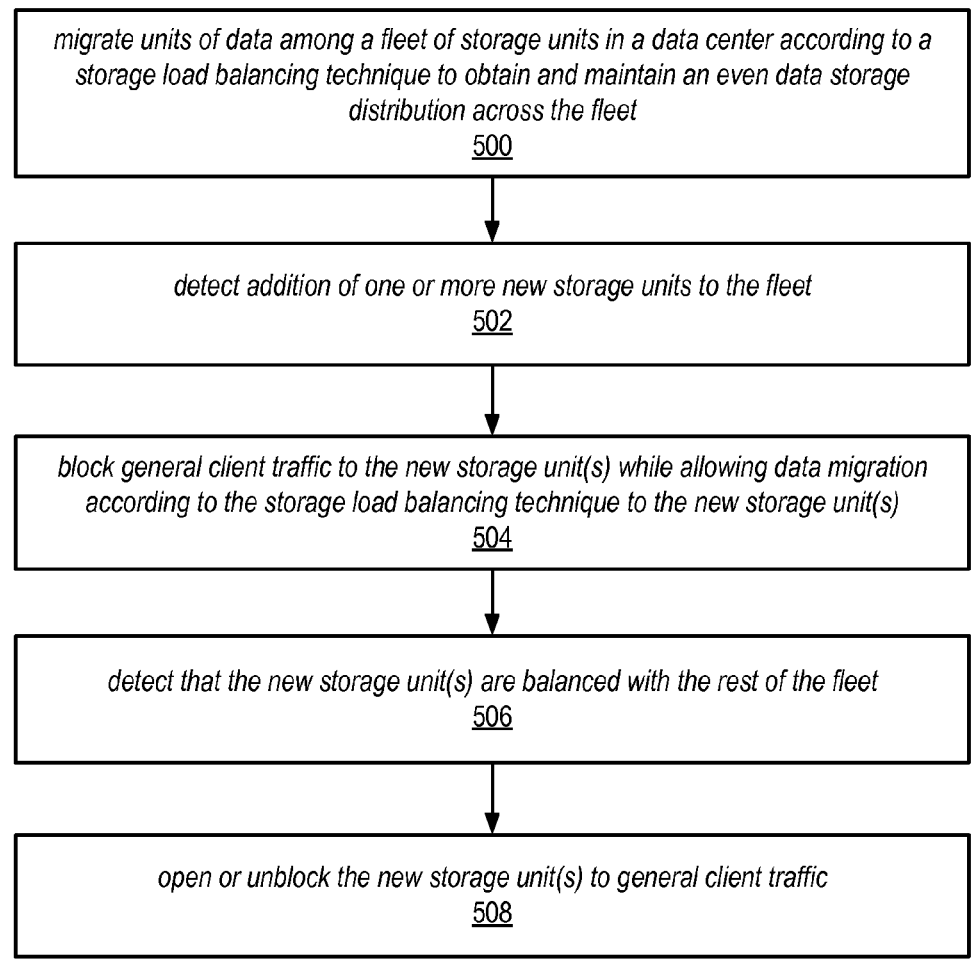
FIG. 5 is a flowchart of a data migration method for obtaining and maintaining an even data storage distribution across a fleet of storage units in a data center, and for balancing new storage units prior to releasing the units to general client traffic, according to at least some embodiments.

FIG. 5 is a flowchart of a data migration method for obtaining and maintaining an even data storage distribution across a fleet of storage units in a data center, and for balancing new storage units prior to releasing the units to general client traffic, according to at least some embodiments. As indicated at 500, data units may be migrated among a fleet of storage units in a data center according to a storage load balancing technique to obtain and maintain an even data storage distribution across the fleet. As indicated at 502, one or more new storage units added to the fleet may be detected. As indicated at 504, general client traffic may be blocked to the new storage unit(s), while allowing data migration according to the storage load balancing technique to the new storage unit(s). As indicated at 506, the method may detect when the new storage unit(s) are substantially balanced with the rest of the fleet. As indicated at 508, the new storage unit(s) may then be unblocked so that the new storage unit(s) may begin receiving general client traffic. The new storage units are thus added to the fleet with a storage load that is substantially the same as the rest of the storage units in the fleet, and with data that is randomly selected and migrated from the rest of the fleet. After the new storage unit(s) are unblocked and thus opened to client traffic, the data migration method may continue to perform storage load balancing on the fleet, including the newly added storage unit(s), as indicated at 500.

Due to the substantially random distribution of client data and the balanced distribution of storage load across the fleet, including both existing and newly added storage units, that is achieved by the data migration method described herein, client I/O traffic (both gets and puts) is substantially evenly distributed across the fleet.

Figure 6:
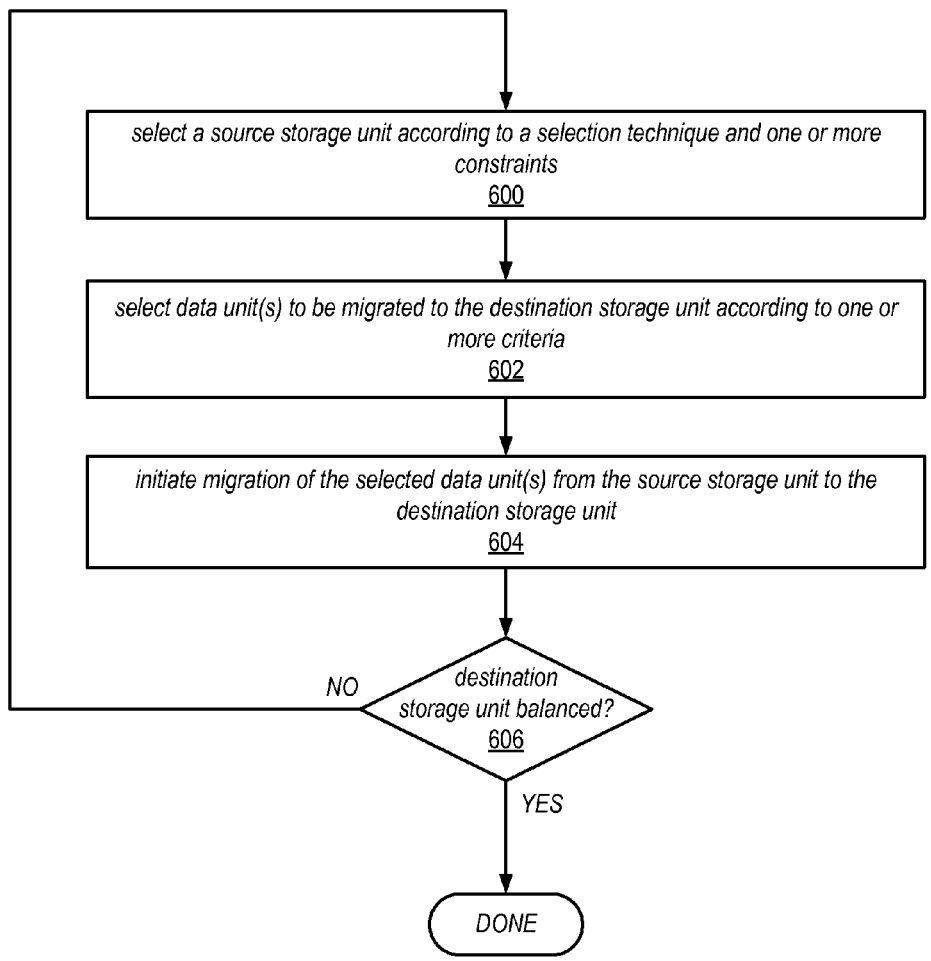
FIG. 6 illustrates a method for balancing a new storage unit with a fleet using a storage load balancing technique, according to at least some embodiments.

FIG. 6 illustrates a method for balancing a new storage unit with a fleet using a storage load balancing technique, according to at least some embodiments. A new storage unit may be detected, and client traffic may be blocked to the new storage unit, as previously described. The method of FIG. 6 may, for example, be performed to migrate data to the new storage unit(s) as indicated at 504 of FIG. 5. As indicated at 600 of FIG. 6, a source storage unit may be selected according to a selection technique, for example an N-choices technique, and one or more resource constraints. Note that other methods than an N-choices technique may be used to select a source storage unit, in some embodiments. A policy may specify one or more resource constraints that are enforced when deciding when to migrate, where to migrate data from and to, and what data to migrate. The resources that may be constrained may include, but are not limited to, network bandwidth, the processing ability of the storage units or other storage- or network-related hardware, and in general any hardware and/or software resource of the distributed storage system that may be impacted by data migration. Through the policy, caps or thresholds on how much of a particular resource can be employed for migration may be enforced.

While not shown in FIG. 6, in some embodiments, a similar selection technique, for example a selection technique based on the N-choices technique, may be used to select a destination storage unit for migration from among two or more candidate destination storage units (e.g., two or more detected new storage units). The destination storage unit may be selected before, after, or concurrently with the selection of the source storage unit.

As indicated at 602, one or more data units to be migrated to the destination storage unit may be selected from the source storage unit according to one or more criteria. The one or more criteria may include, but are not limited to, the type of data. For example, the criteria that are applied when selecting data units to be migrated may act to ensure that a destination storage unit is not overloaded with a lot of relatively small, or relatively active, data. In addition, the criteria applied to selecting data units for migration may ensure that a copy of a data unit already on a destination storage device is not copied to the destination storage device.

As indicated at 604, migration of the selected data unit(s) from the source storage unit to the destination storage unit may be initiated. In at least some embodiments, data mover components on the storage units may perform the actual moving of the data during migration, and thus initiating the migration may involve directing the data mover component of one or more of the involved storage units to perform the migration. At 606, if the new storage unit is not yet balanced with the rest of the fleet, the method returns to 600 to select another source storage unit according to the selection technique and one or more constraints. At 606, if the new storage unit is balanced with the rest of the fleet, the method is done, and the new storage unit may be unblocked so that the storage unit may begin receiving general client traffic. Thus, the method iterates until the new storage unit is substantially balanced with the rest of the fleet, and then releases the new storage unit as another unit in the fleet, available for client traffic.

While not shown in FIG. 6, in some embodiments, the method may select another destination storage unit and return to element 600 to balance the other destination storage unit.

Figure 7:
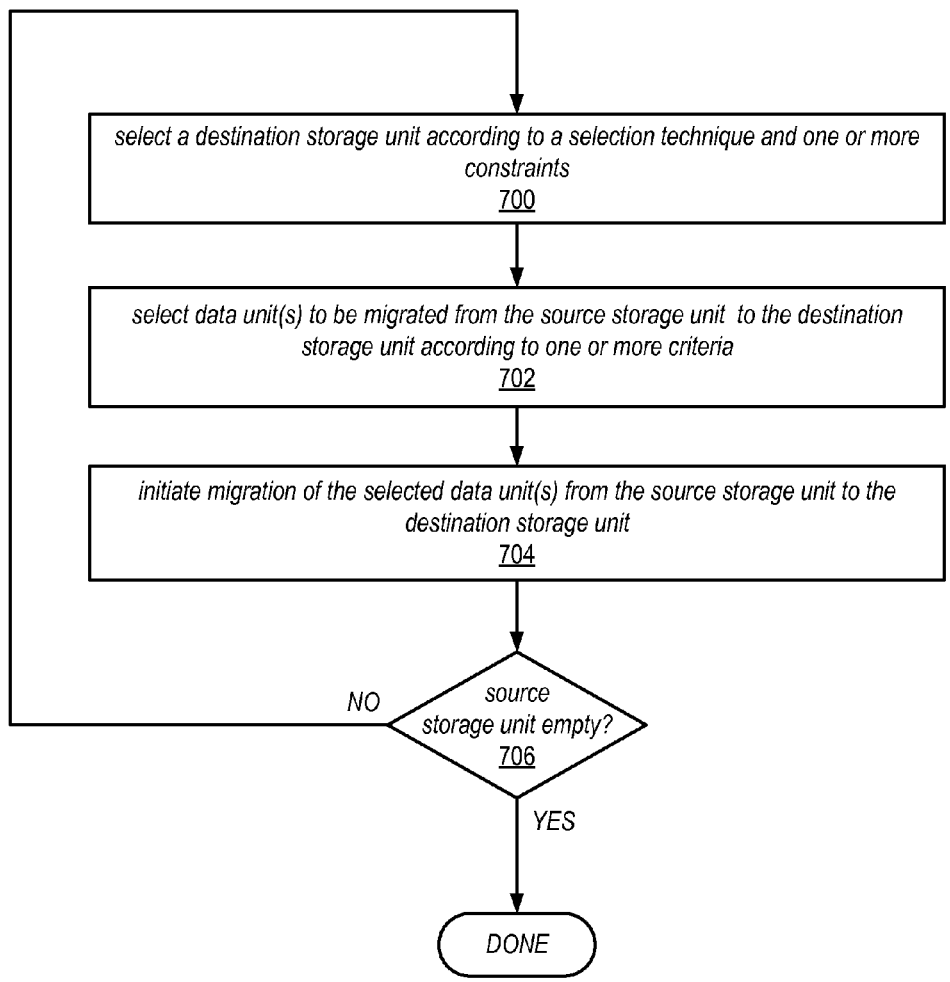
FIG. 7 illustrates a method for removing a storage unit from a fleet using a storage load balancing technique, according to at least some embodiments.

While the above generally describes migrating data to newly added storage units, embodiments of the data migration technique as described herein may also be applied when removing storage units from a fleet. FIG. 7 illustrates a method for removing a storage unit from a fleet using a storage load balancing technique, according to at least some embodiments. A storage device to be removed from the fleet may be selected (e.g., using a selection technique as described in reference to FIG. 6) or otherwise designated as a source storage unit. Client traffic to the source storage unit may be blocked so that new data is not written to the storage unit. As indicated at 700, a destination storage unit may be selected according to a selection technique, for example an N-choices technique, and one or more resource constraints. Note that other methods than an N-choices technique may be used to select a destination storage unit, in some embodiments. As indicated at 702, one or more data units to be migrated to the destination storage unit may be selected from the source storage unit according to one or more criteria. As indicated at 704, the selected data unit(s) may be migrated from the source storage unit to the destination storage unit. At 706, if the source storage unit is not yet empty, the method returns to 700 to select another destination storage unit according to the selection technique and one or more constraints. At 706, if the source storage unit is empty, the method is done, and the empty source storage unit may be removed from the fleet. Thus, the method iterates, randomly distributing the data from the source storage unit to the rest of the fleet, until the source storage unit is empty, after which the source storage unit may be removed from the fleet.

While not shown in FIG. 7, in some embodiments, the method may select another source storage unit and return to element 700 to migrate data from the other source storage unit.

Figure 8:
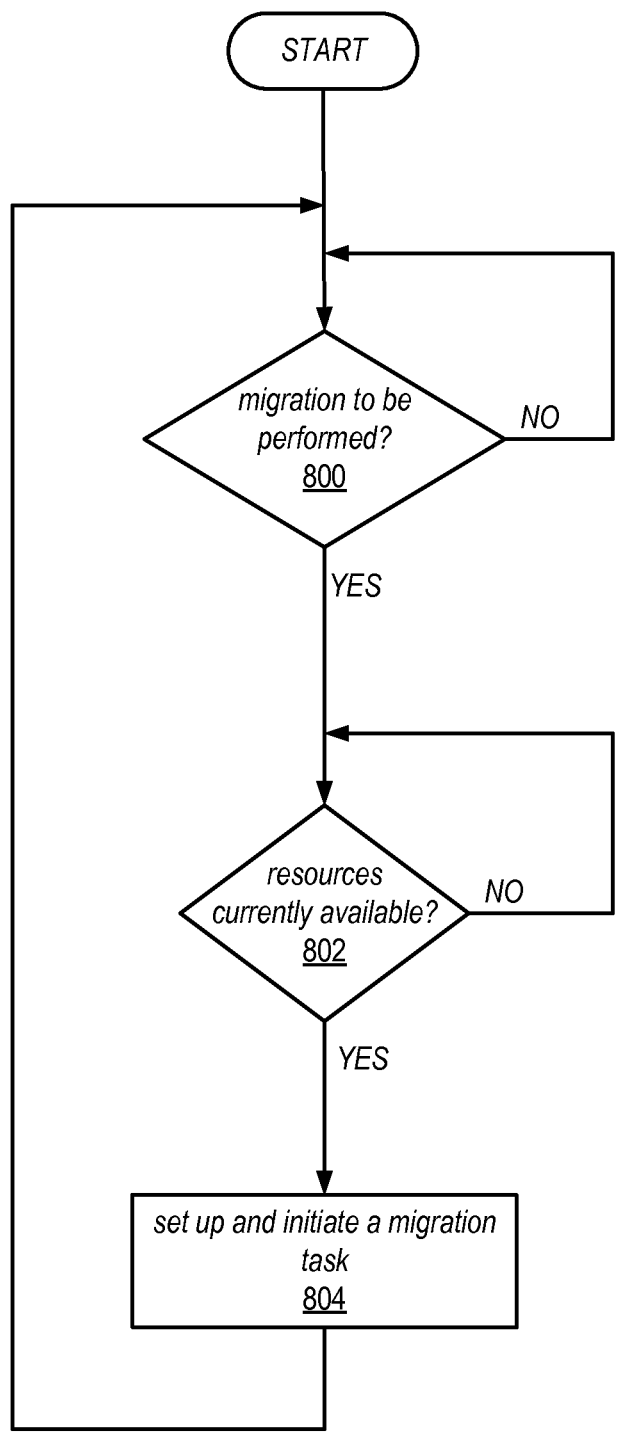
FIG. 8 illustrates a data migration technique that may initiate migration tasks when necessary and when resources are available, and that may initiate multiple migration tasks to execute substantially simultaneously, according to at least some embodiments.

The methods illustrate in FIGS. 6 and 7 may be viewed as individual migration tasks or jobs. In at least some embodiments, the data migration technique may initiate two or more such migration tasks that may run substantially simultaneously to perform migration from source storage nodes to destination storage nodes, subject to one or more resource constraints. FIG. 8 illustrates a data migration technique that may initiate migration tasks when necessary and when resources are available, and that may initiate multiple migration tasks to execute substantially simultaneously, according to at least some embodiments. As indicated at 800, the technique may determine if there is migration to be performed. For example, migration may need to be performed in response to detecting that one or more new storage units have been added to the data center network, or in response to detecting that one or more storage units are to be removed from the data center network. In at least some embodiments, at 800 if there is no migration that currently needs to be performed, the technique may wait and check again at a later time. Alternatively, the data migration technique may be event-driven, in which case the technique waits for an event that indicates the need for migration.

At 800, if there is migration that needs to be performed, then the data migration technique may check to see if resources are available to perform the migration according to one or more resource constraints, as indicated at 802. The resources that may be constrained may include, but are not limited to, network bandwidth, the processing capacity of the storage units or other storage- or network-related hardware, and in general any hardware and/or software resource of the distributed storage system that may be impacted by data migration. In at least some embodiments, caps or thresholds on how much of a particular resource may be used when migrating data may be specified and enforced via a policy.

At 802, if resources are not currently available according to the one or more resource constraints to perform migration, the data migration technique may wait for an interval and check again. If resources are available to perform migration according to the one or more resource constraints, then the data migration technique may set up and initiate a migration task, as indicated at 804. Example methods for performing element 804 are illustrated in FIGS. 6 and 7. The technique may then return to element 800 to determine if more migration needs to be performed, and if so, may set up and initiate another migration task if and when resources are available. Thus, one or more additional migration tasks may be initiated before a previously initiated migration task has completed. Note that enforcing appropriately specified resource constraints at 802 acts to prevent the data migration technique from overwhelming the data center resources.

Illustrative System

In at least some embodiments, a server that implements a portion or all of one or more of the technologies described herein, including but not limited to the methods for optimizing resource utilization in distributed storage systems, may include a general-purpose computer system that includes or is configured to access one or more computer-accessible media, such as computer system 2000 illustrated in FIG. 9. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the methods for optimizing resource utilization in distributed storage systems, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 2 through 4F, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 8 for implementing embodiments of methods for optimizing resource utilization in distributed storage systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed storage system, comprising:
a plurality of storage units configured for access by a plurality of clients and each coupled to a network, wherein the plurality of storage units collectively store data for the plurality of clients;
at least one hardware processor and associated memory coupled to the network that implement a distributed storage control system configured to manage data storage across the plurality of storage units, wherein to manage the data storage the distributed storage control system is configured to:
track storage space utilization among the plurality of storage units, including an aggregate storage space utilization for the plurality of storage units;
based at least in part on the tracked storage space utilization, select, from among the plurality of storage units, one or more source storage units and one or more destination storage units, wherein the storage space utilization of the one or more source storage units is higher than the aggregate storage space utilization, and wherein the storage space utilization of the of the one or more destination storage units is lower than the aggregate storage space utilization;
determine previously stored data on the one or more source storage units to migrate to the one or more destination storage units according to at least the tracked storage space utilization; and
migrate the determined previously stored data from the one or more selected source storage units to the one or more selected destination storage units, resulting in the storage space utilization across the plurality of storage units being more evenly balanced.

2. The distributed storage system as recited in claim 1, wherein the distributed storage control system is configured to perform said track, said select, said determine and said migrate as a background process while general client I/O traffic is performed at the plurality of storage units for the plurality of clients to read previously stored data from and store new data to the plurality of storage units via the network.

3. The distributed storage system as recited in claim 1, wherein to track storage space utilization among the plurality of storage units, the distributed storage control system is configured to track both storage space utilization on individual storage units and the aggregate storage space utilization across the plurality of storage units.

4. The distributed storage system as recited in claim 3, wherein to perform said select one or more source storage units and one or more destination storage units, the distributed storage control system is configured to compare the storage space utilization on individual storage units to an aggregate target based on the aggregate storage space utilization.

5. The distributed storage system as recited in claim 1, wherein to perform said migrate the determined previously stored data, the distributed storage control system is configured to migrate data from a plurality of selected source storage units to one destination storage unit.

6. The distributed storage system as recited in claim 1, wherein the policy further specifies one or more caps or thresholds on how much network bandwidth or processing capacity is allowed for migrating stored data from selected source storage units to destination storage units.

7. The distributed storage system as recited in claim 1, wherein the policy further specifies one or more data type criteria to avoid overloading a particular storage unit with a particular type of data based on data object size or activity level.

8. A method, comprising:
performing, by one or more computing devices:

managing data storage across a plurality of storage units configured for access by a plurality of clients and coupled to a same network as the one or more computing devices, wherein the plurality of storage units collectively store data for the plurality of clients, and wherein said managing data storage access comprises:

tracking storage space utilization among the plurality of storage units, including an aggregate storage space utilization for the plurality of storage units;

based at least in part on the tracked storage space utilization, selecting, from among the plurality of storage units, one or more source storage units and one or more destination storage units, wherein the storage space utilization of the one or more source storage units is higher than the aggregate storage space utilization, and wherein the storage space utilization of the of the one or more destination storage units is lower than the aggregate storage space utilization;

determining previously stored data on the one or more source storage units to migrate to the one or more destination storage units according to at least the tracked storage space utilization; and migrating the determined previously stored data from the one or more selected source storage units to the one or more selected destination storage units, resulting in the storage space utilization across the plurality of storage units being more evenly balanced.

9. The method of claim 8, wherein said tracking, said selecting, said determining and said migrating are performed as part of a background process while general client I/O traffic is performed at the plurality of storage units for the plurality of clients to read previously stored data from and store new data to the plurality of storage units via the network.

10. The method of claim 8, wherein said tracking storage space utilization among the plurality of storage units, comprises tracking both storage space utilization on individual storage units and the aggregate storage space utilization across the plurality of storage units.

11. The method of claim 10, wherein said selecting one or more source storage units and one or more destination storage units comprises comparing the storage space utilization on individual storage units to an aggregate target based on the aggregate storage space utilization.

12. The method of claim 8, wherein said migrating the determined previously stored data comprises migrating data from a plurality of selected source storage units to one destination storage unit.

13. The method of claim 8, wherein the policy further specifies one or more caps or thresholds on how much network bandwidth or processing capacity is allowed for migrating stored data from selected source storage units to destination storage units.

14. The method of claim 8, wherein data items are replicated or erasure coded among the plurality of storage units for redundancy, wherein said determining previously stored data to migrate avoids migrating redundancy data for a data item from a source storage unit to a destination storage unit already storing redundancy data for that data item.

15. A non-transitory, computer-readable storage medium, storing program instructions that when executed by one or more computing devices cause the one or more computing devices to implement a distributed storage control system that implements:

managing data storage across a plurality of storage units configured for access by a plurality of clients and coupled to a same network as the distributed storage control system, wherein the plurality of storage units collectively store data for the plurality of clients, and wherein the managing data storage access comprises:

tracking storage space utilization among the plurality of storage units, including an aggregate storage space utilization for the plurality of storage units;

based at least in part on the tracked storage space utilization, selecting, from among the plurality of storage units, one or more source storage units and one or more destination storage units, wherein the storage space utilization of the one or more source storage units is higher than the aggregate storage space utilization, and wherein the storage space utilization of the of the one or more destination storage units is lower than the aggregate storage space utilization;

determining previously stored data on the one or more source storage units to migrate to the one or more destination storage units according to at least the tracked storage space utilization; and migrating the determined previously stored data from the one or more selected source storage units to the one or more selected destination storage units, resulting in the storage space utilization across the plurality of storage units being more evenly balanced.

16. The non-transitory, computer-readable storage medium of claim 15, wherein said tracking, said selecting, said determining and said migrating are performed as part of a background process while general client I/O traffic is performed at the plurality of storage units for the plurality of clients to read previously stored data from and store new data to the plurality of storage units via the network.

17. The non-transitory, computer-readable storage medium of claim 15, wherein, in said tracking storage space utilization among the plurality of storage units, the program instructions cause the distributed storage control system to implement tracking both storage space utilization on individual storage units and the aggregate storage space utilization across the plurality of storage units.

18. The non-transitory, computer-readable storage medium of claim 17, wherein, in said selecting one or more source storage units and one or more destination storage units, the program instructions cause the distributed storage control system to implement comparing the storage space utilization on individual storage units to an aggregate target based on the aggregate storage space utilization.

19. The non-transitory, computer-readable storage medium of claim 15, wherein, in said migrating the determined previously stored data, the program instructions cause the distributed storage control system to implement migrating data from a plurality of selected source storage units to one destination storage unit.

20. The non-transitory, computer-readable storage medium of claim 15, wherein, in said selecting one or more source storage units, the program instructions cause the distributed storage control system to implement applying an N-choices technique that randomly selects a subset of the plurality of storage units and then selects the one or more source storage units from among the storage units of the selected subset according to one or more selection criteria specified in the policy.

* * * * *